United States Patent [19]

Goel

[11] Patent Number: 4,613,662

[45] Date of Patent: Sep. 23, 1986

[54] PROCESS FOR CATALYTIC PREPARATION OF POLY(ETHER-AMIDE) POLYMERIC COMPOSITION FROM OXAZOLINE AND POLYPHENOL

[75] Inventor: Anil B. Goel, Worthington, Ohio

[73] Assignee: Ashland Oil, Inc., Ashland, Ky.

[21] Appl. No.: 763,166

[22] Filed: Aug. 7, 1985

[51] Int. Cl.$^4$ .................. C08G 69/00; C08G 14/04
[52] U.S. Cl. .................................. 528/137; 528/138; 528/140; 528/147; 528/153; 528/155; 528/163; 528/211; 528/219
[58] Field of Search ............... 528/153, 155, 163, 211, 528/219, 137, 138, 140, 147

[56] References Cited

U.S. PATENT DOCUMENTS 4,195,154  3/1980  Kaiser et al. .................. 528/98
4,430,491  2/1984  Culbertson et al. ........... 528/163

Primary Examiner—Harold D. Anderson
Attorney, Agent, or Firm—John F. Jones

[57] ABSTRACT

A process comprising copolymerizing an oxazoline with a bis-or poly-phenolic compound in the presence of a catalyst which is a cationic complex of an alkali or an alkaline earth metal at a temperature in the range of from about 100° to 200° C. is described.

6 Claims, No Drawings

PROCESS FOR CATALYTIC PREPARATION OF POLY(ETHER-AMIDE) POLYMERIC COMPOSITION FROM OXAZOLINE AND POLYPHENOL

This invention relates to an improved process for the production of crosslinked polymeric compositions composed of repeating segmental residues having ether and amide linkages by the copolymerization of an oxazoline and a bis- or poly-phenolic compound in the presence of a catalyst which is a cationic complex of an alkali or alkaline earth metal.

This invention is an improvement over the process described in U.S. Pat. No. 4,430,491.

It is known that a 2-oxazoline will react with a compound containing an active hydrogen group of sufficient acid strength in a ring opening type mechanism to provide a secondary amide. Active hydrogen compounds reported in the prior art capable of undergoing the indicated reaction include carboxylic acids, thiols and phenols, the latter embracing the various phenol-aldehyde or phenol-ketone condensates containing a plurality of aromatic hydroxy groups. The reaction of a novalak in this manner to prepare a polyamine precursor is exemplified in U.S. Pat. No. 4,195,154.

In accordance with this invention, an improved process for preparing polymeric compositions having segmental residues containing ether and amido linkages is provided. The improved process involves carrying out the polymerization reaction of a compound having a plurality of 2-oxazoline groups with a compound having a plurality of aromatic hydroxyl groups in the presence of a catalytic amount of a catalyst which comprises an alkali or alkaline earth metal complex. The underlying reaction mechanism is believed to be one wherein the active hydrogen atom of an aromatic hydroxyl group effects ring opening of the 2-oxazoline group resulting in the rearrangement thereof to form a secondary amide linkage. The reaction is believed to proceed progressively to provide the indicated alternating ether and amido linkages along the component polymeric chains. Use of the cationic catalyst is believed to result in simultaneous ring opening homopolymerization of oxazoline. Thermoplastic compositions are obtained when each of the respective reactants is difunctional in the absence of any catalyst. However, crosslinked or thermoset compositions, on the otherhand, are provided when either the functional groups of said respective reactants total at least five or a cationic catalyst is used.

The oxazolines useful in the practice of this invention include a variety of such compounds having at least two 2-oxazoline groups per molecule. The applicable polyfunctional oxazolines are devoid of other functional groups capable of reacting in any manner with either an oxazoline group or an aromatic hydroxyl group. From the standpoint of potential commercial availability in commodity proportions the oxazolines derived from the polycarboxylic acids are preferred. Particularly exemplary of such polyacids are the aromatic acids; e.g., isophthalic acids, terephthalic acid and trimesic acid. The indicated polyfunctional oxazoline compounds can be conveniently prepared by the reaction of the corresponding esters of said polyacids and ethanolamines.

Representative polyfunctional oxazoline compounds useful in the process of this invention include the following bis-oxazolines:

4,4', 5,5'-tetrahydro-2,2'bisoxazole; a 2,2'-(alkanediyl) bis (4,5-dihydrooxazole), e.g. 2,2'-(1,4-butanediyl) bis(4,5-dihydrooxazole); a 2,2'-(arylene) bis (4,5-dihydrooxazole), e.g. 2,2'-(1,4-phenylene) bis (4,5-dihydrooxazole), 2,2'-(1,5-naphthalenyl) bis (4,5-dihydrooxazole) and 2,2'-(1,8-anthracenyl) bis (4,5-dihydrooxazole); a sulfonyl, oxy, thio or alkylene bis 2-(arylene) (4,5-dihydrooxazole), e.g., sulfonyl bis 2-(1,4-phenylene) (4,5-dihydrooxazole), oxy bis 2-(1,4-phenylene) (4,5-dihydrooxazole), thio bis 2-(1,4-phenylene) (4,5-dihydrooxazole) and methylene bis-(1,4-phenylene) (4,5-dihydrooxazole); a 2,2',2''-(arylene) tris (4,5-dihydrooxazole), e.g., 2,2',2''-(1,3,5-phenylene) tris (4,5-dihydrooxazole); a poly(2-alkenyl) 4,5-hydrooxazole), e.g., poly(2-(2-propenyl) 4,5-dihydrooxazole), and the like.

Representative compounds having at least two aromatic hydroxyl groups per molecule which are useful in the process of this invention include the various benzene and fused aromatic ring diols and triols, e.g., 1,4-benzene diol (hydroquinone), 1,3-benzenediol (resorcinol), 1,4-haphthalene diol and 1,3,5-benzenetriol; the biphenyl diols, e.g., (1,1'biphenyl)-2,2'-diol; the alkylene and cycloalkylene bisphenols, e.g., 2,2'-methylene bisphenol, 4,4'(1-methylethylidene) bisphenol (Bisphenol A), 4,4'-phenylmethylene) bisphenol, 4,4'-cyclohexanediyl)bisphenol, 4,4'-(1,2-diethyl-1,2-ethenediyl) bisphenol, and 3,4-bis(4-hydroxyphenyl)-2,4-hexadiene; the arylene bisphenols, e.g., 4,4'-phenylene bisphenol; the oxy, thio and sulfonylbisphenols, e.g., 2,3-oxybisphenol, 4,4'-thiobisphenol and 2,2'sulphonyl bisphenol; the bis(hydroxyaryl) alkanones, e.g., bis (4-hydroxyphenyl) methanone, 1,5-dihydroxy-9,10-anthracenedione and 4-(bis(4-hydroxyphenyl)methylene)-2,5-cyclohexadiene-1-one; the various benzamide and benzoate derivatives, e.g., 2-hydroxy-N-(4-hydroxyphenyl) benzamide, 4-hydroxy-4-hydroxyphenyl benzoate, 2-methyl-2-(4-hydroxybenzoyl)oxymethyl-1,3-propanediyl- 4-hydroxybenzoate, bis (4-hydroxy benzoate)-1,2-ethandiyl; 2-(4-hydroxybenzoate) ethyl ether, bis (4-hydroxybenzamide)-1,6-hexanediyl and bis (4-hydroxy benzamide)-1,4-benzenediyl.

The above-described oxazoline and phenolic compounds are, as specifically indicated, illustrative of the respective types of compounds useful in the practice of this invention. Besides the various isomers of these representative compounds, a broad variety of substituted compounds are likewise applicable. In respect of the latter compounds, the sole requirement being that the substituent group is not reactive with either an oxazoline or an aromatic hydroxyl group. Examples of such substituent groups include alkyl, aryl, halo, cyano, nitro, alkoxy, aryloxy, alkyl and aryl sulfides, amine and alkyl or aryl substituted amine, amide, ester, and the like.

In addition to the phenolic compounds noted above, a variety of oligomers containing a plurality of phenolic residues constitute an important class of materials for reacting with the bis-oxazolines in accordance with this invention. Particularly representative of such oligomers are the base or acid catalyzed phenol formaldehyde condensation products preferably the latter condensates; viz., the novalaks. Besides the conventional resoles, the phenolic resins characterized in having benzylic ether linkages prepared by metal ion catalysis such as disclosed in U.S. Pat. No. 3,485,797 are applicable. Other suitable polyphenol oligomers include the addition polymers and copolymers of a vinyl substituted phenol such as 4-ethenyl phenol.

The process of this invention is preferably carried out in the absence of a solvent or diluent. The process is preferably carried out in the melt phase which usually constitutes the mode of choice in the preparation of matrix resins in the production of composites which represents a prime utility of the materials of the present invention. In some cases, it may be desirable to carry out the initial polymerization reaction in solution employing a high boiling aprotic solvent such as, for example, N.N-dimethylacetamide, N,N-dimethylformamide, 1-methyl-2-pyrrolidone, dimethyl sulfoxide, and the like. The polymerization product in such a case can then be isolated and curing completed in a subsequent molding operation, in the presence of the cationic catalyst.

The reaction temperature for both of the indicated methods of preparation broadly ranges from about 100 degrees C. to 200 degrees C. In preparing thermoplastic and thermoset compositions, the preferred stoichiometry ranges from 0.1–1.0 equivalent of phenolic reactant per equivalent of oxazoline. The use of a catalyst in the process of this invention is required. Applicable catalysts for use in the process of this invention are those of the formula M(X)n wherein M represents an alkali metal or an alkaline earth metal moiety,, X represents $BF_4$, $PF_6$, $BPh_4$, $ClO_4$ and the like, wherein pH represents phenyl and n represents 1 or 2. The catalyst is effective when used in from 0.2 to 10% by weight based on the weight of oxazoline.

The process of this invention is further illustrated in the following representative examples.

EXAMPLE 1

This example, which is outside the scope of the present invention, demonstrates the formation of a thermoplastic polymer by reaction between a bis-oxazoline and a bis-phenolic material in the absence of the catalyst of this invention. The bis-oxazoline used was 2,2'-(1,4-phenylene) bis(4,5-dihydrooxazole) (10.0 g) which was mixed with 3.5 g of resorcinol and the mixture was heated at 160 degrees C. for 3½ hours to give a thermoplastic polymeric material which was found to have a melting point of about 75 degrees C. and was soluble in solvents such as N-methyl-2-pyrrolidinone (NMP) and dimethyl formamide (DMF).

EXAMPLE 2

The bis-oxazoline and resorcinol of Example 1 plus a catalyst were employed in this example. Resorcinol (3.5 g) and lithium fluoborate (0.2 g) were mixed and heated at 120 degrees C. to give a purple colored solution. To this solution were added 10 g of the bis-oxazoline melt and the mixture was brought to 160 degrees C. in the form of a melt. A rapid gellation took place in the mixture within 20 seconds of the mixing to give a thermoset polymer which was postcured at 175 degrees C. for one hour. The resulting polymer was insoluble in DMF and NMP. The polymer was found to have a Tg by DSC (Differential scanning calorimetry) of 160 degrees C. and a 10% weight loss in nitrogen by TGA (thermogravimetric analysis) occured at about 400 degrees C.

EXAMPLE 3

The procedure of Example 2 was followed using 10 g of the bis-oxazoline, 2.5 g of resorcinol and 0.1 g of lithium fluoborate. Gellation occurred within 30 seconds at about 160 degrees C. to give a thermoset polymer which was insoluble in DMF and NMP. The polymer which was postcured at 175 degrees C. for two hours showed no distinct transition (Tg) below 300 degrees C. and 10% weight loss by TGA occurred at about 388.4 degrees C.

EXAMPLE 4

The procedure of Example 2 was followed using 10 g of bis-oxazoline, 2 g of resorcinol and 0.1 g of lithium fluoborate. The thermoset polymer formed within one minute of heating at 160 degrees C. and was found to be insoluble in DMF (dimethyl formamide) and NMP (N-methyl pyrrolidone) The polymer had no distinct Tg below 300° C. and the decomposition temperature was about 393° C.

EXAMPLE 5

The procedure of Example 2 was followed using 12 g of the bis-oxazoline of Example 2, 5 g of an oligomeric phenol resin obtained by phenol/formaldehyde condensation (equivalent weight of 90–100) and 0.2 g of lithiium fluoborate. The resulting mixture was heated at 160 degrees C., gellation occured within five minutes and the resulting polymer was postcured at about 165° C. for two hours. The final thermoset polymer was found to be insoluble in DMF and DMP. The Tg for this polymer by DSC was found to be 200° C. and decomposition occurred at 370° C.

I claim:

1. A process comprising copolymerizing an oxazoline with a bis- or poly-phenolic compound in the presence of a catalyst which conforms to the formula $M(X)_n$ wherein M represents an alkali or alkaline earth metal moiety, X represents $BF_3$, $BF_4$, $BPH_4$ or $ClO_4$, and n represents 1 or 2 at a temperature in the range of from about 100° to 200° C.

2. The process of claim 1 wherein the oxazoline has at least two 2-oxazoline groups per molecule.

3. The process of claim 2 wherein the comonomer ratio is from 0.1–1.0 equivalent of the phenolic compound per equivalent of oxazoline.

4. The process of claim 3 wherein the catalyst is lithium fluoborate.

5. The process of claim 4 wherein the oxazoline is 2,2'-(1,4-phenylene) bis(4.5-dihydrooxazole) and the bis-phenolic compound is resorcinol.

6. The process of claim 4 wherein the oxazoline is 2,2'-(1,4-phenylene) bis(4,5-dihydrooxazole and the polyphenolic compound is an oligomeric phenol compound obtained by phenol-formaldehyde condensation.

* * * * *